(12) United States Patent
Segev et al.

(10) Patent No.: US 11,537,524 B2
(45) Date of Patent: Dec. 27, 2022

(54) EFFECTIVE PCIE UTILIZATION BY PCIE TLP COALESCING

(71) Applicant: Western Digital Technologies, Inc., San Jose, CA (US)

(72) Inventors: Amir Segev, Meiter (IL); Amir Rozen, Rishon Lezion (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 30 days.

(21) Appl. No.: 17/184,531

(22) Filed: Feb. 24, 2021

(65) Prior Publication Data

US 2022/0164291 A1 May 26, 2022

Related U.S. Application Data

(60) Provisional application No. 63/116,459, filed on Nov. 20, 2020.

(51) Int. Cl.
*G06F 12/00* (2006.01)
*G06F 12/0886* (2016.01)
*G06F 13/16* (2006.01)

(52) U.S. Cl.
CPC ...... *G06F 12/0886* (2013.01); *G06F 13/1673* (2013.01); *G06F 2212/1016* (2013.01)

(58) Field of Classification Search
CPC ............. G06F 12/0886; G06F 13/1673; G06F 2212/1016
USPC ............................................................ 711/3
See application file for complete search history.

(56) References Cited

U.S. PATENT DOCUMENTS

| | | |
|---|---|---|
| 6,542,941 B1 | 4/2003 | Simpson, III |
| 7,424,566 B2 | 9/2008 | Manula et al. |
| 10,069,597 B2 | 9/2018 | Benisty et al. |
| 10,095,645 B2 | 10/2018 | Davis et al. |
| 10,628,369 B2 | 4/2020 | Minato et al. |

(Continued)

OTHER PUBLICATIONS

Kim, Seonbong et al.; "Optimized I/O Determininsm for Emerging NVM-based NVMe SSD in an Enterprise System", Proceedings of the 55th Annual Design Automation Conference, Jun. 24, 2018 (6 pages).

(Continued)

*Primary Examiner* — Mardochee Chery
(74) *Attorney, Agent, or Firm* — Patterson & Sheridan, LLP; Steven H. VerSteeg

(57) ABSTRACT

The present disclosure generally relates to effective transport layer packet (TLP) utilization. When the controller of the data storage device generates a request for transferring data to or from the storage device, the request is stored in a merging buffer. The merging buffer may include previously generated requests, where the previously generated requests and the new requests are merged. A timeout counter is initialized for the requests stored in the merging buffer. The timeout counter has a configurable threshold value that corresponds to a weight value, adjusted for latency or bandwidth considerations. When the merged request is greater than the maximum TLP size, the merged request is partitioned, where at least one partition is in the size of the maximum TLP size. The request is sent from the buffer when the request is in the size of the maximum TLP size or when the threshold value is exceeded.

19 Claims, 7 Drawing Sheets

(56) References Cited

U.S. PATENT DOCUMENTS

| | | | |
|---|---|---|---|
| 10,740,000 | B2 | 8/2020 | Benisty |
| 10,789,019 | B2 | 9/2020 | Kim et al. |
| 2001/0011323 | A1* | 8/2001 | Ohta ................... G06F 3/061 |
| | | | 711/158 |
| 2003/0188054 | A1 | 10/2003 | Yosimoto et al. |
| 2009/0037689 | A1 | 2/2009 | Kanuri |
| 2009/0228630 | A1* | 9/2009 | Wang ................ H04L 49/901 |
| | | | 711/E12.001 |
| 2014/0143471 | A1* | 5/2014 | Moyer ............... G06F 13/4059 |
| | | | 710/310 |
| 2015/0254022 | A1 | 9/2015 | Oikawa |
| 2016/0188473 | A1 | 6/2016 | Kruckemyer et al. |
| 2017/0116117 | A1 | 4/2017 | Rozen et al. |
| 2017/0285940 | A1 | 10/2017 | Benisty et al. |
| 2018/0039448 | A1* | 2/2018 | Harasawa ........... G06F 3/0619 |
| 2018/0136869 | A1 | 5/2018 | Mola |
| 2019/0235759 | A1 | 8/2019 | Sen et al. |
| 2019/0278485 | A1* | 9/2019 | Benisty ............... G06F 3/0659 |
| 2020/0112525 | A1 | 4/2020 | Donley et al. |
| 2020/0192804 | A1 | 6/2020 | Lee et al. |
| 2020/0204495 | A1 | 6/2020 | Mallick et al. |

OTHER PUBLICATIONS

Related U.S. Appl. No. 16/512,312, filed Jul. 15, 2019.
K Yogendhar, et al., Realizing the Performance Potential of a PCI-Express IP, ,Rambus Chip Technologies India (Pvt) Ltd., Design and Reuse, https://www.design-reuse.com/articles/15900/realizing-the-performance-potential-of-a-pci-express-ip.html, last visited Jan. 8, 2022, 9 pp.

* cited by examiner

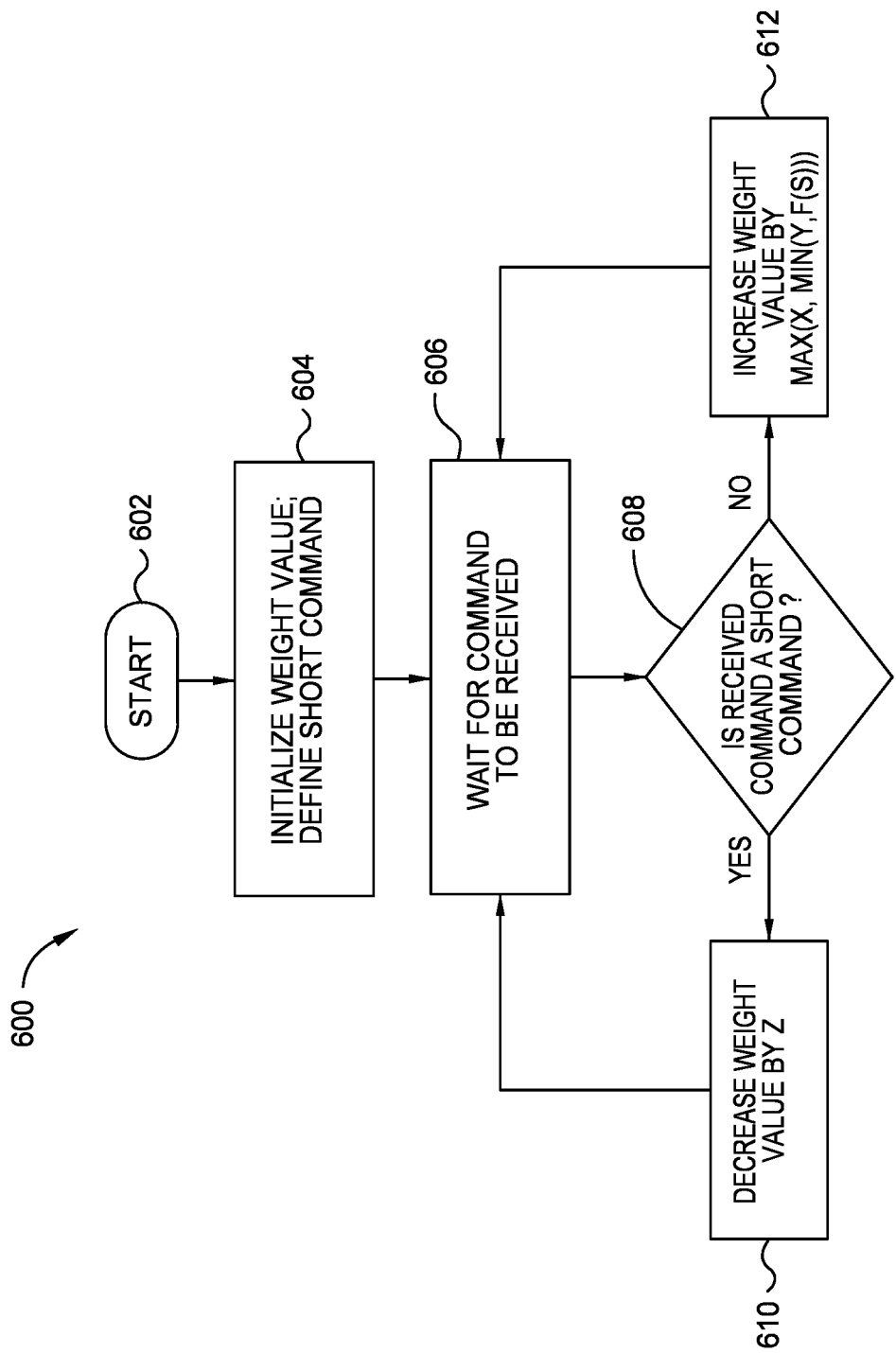

EFFECTIVE PCIE UTILIZATION BY PCIE TLP COALESCING

CROSS-REFERENCE TO RELATED APPLICATIONS

This application claims benefit of U.S. provisional patent application Ser. No. 63/116,459, filed Nov. 20, 2020, which is herein incorporated by reference.

BACKGROUND OF THE DISCLOSURE

Field of the Disclosure

Embodiments of the present disclosure generally relate to effective transport layer packet (TLP) utilization.

Description of the Related Art

Data storage devices, such as solid state drives, are frequently connected to host computers over the non-volatile memory express (NVMe) interface. In such systems, the host computer initiates data transfers by preparing a data buffer containing the data to be transferred to the storage device, or from the storage device. In NVMe, the physical memory locations of the data buffer are indicated by either physical region page (PRP) entries or scatter gather lists (SGL). Using either PRP or SGL, the host computer transfers pointers of the physical memory locations to the storage device, as host command pointers. The host computer sends at least as many pointers as physical memory locations are used in storing the data for transfer.

When working with NVMe over PCIe, the host computer may send pointers pointing to contiguous logical addresses. However, when transferring the data associated with the pointers, the data storage device may be inefficient in utilizing the physical (PCIe) bus. The inefficient utilization may result in performance degradation. For example, each packet of data (i.e., transport layer packet (TLP)), that is transferred over the PCIe bus may have about 24 bytes of overhead. When the payload size of data is about 256 bytes, the overhead occupies about 10% of the total payload size. Furthermore, when the data from contiguous logical addresses is larger than the maximum TLP, the data storage device may break the data into several smaller TLPs. Each of the smaller TLPs includes overhead, which may increase latency and require more bandwidth.

Therefore, there is a need in the art for an improved TLP utilization that optimizes latency and bandwidth.

SUMMARY OF THE DISCLOSURE

The present disclosure generally relates to effective transport layer packet (TLP) utilization. When the controller of the data storage device generates a request for transferring data to or from the storage device, the request is stored in a merging buffer. The merging buffer may include previously generated requests, where the previously generated requests and the new requests are merged. A timeout counter is initialized for the requests stored in the merging buffer. The timeout counter has a configurable threshold value that corresponds to a weight value, adjusted for latency or bandwidth considerations. When the merged request is greater than the maximum TLP size, the merged request is partitioned, where at least one partition is in the size of the maximum TLP size. The request is sent from the buffer when the request is in the size of the maximum TLP size or when the threshold value is exceeded.

In one embodiment, a data storage device includes a memory device and a controller coupled to the memory device. The controller is configured to receive a new command, generate one or more requests associated with the new command, determine whether a beginning of a newly generated one or more requests is continuous with an end of a previous request or a merged request stored in a buffer, and either update a length of the previous request or the merged stored in the buffer to a new length that includes the newly generated one or more requests or send the previous request or the merged request from the buffer and push the newly generated one or more requests to the buffer.

In another embodiment, a data storage device includes a memory device and a controller coupled to the memory device. The controller is configured to initialize a weight value, wherein the weight value affects a maximum threshold value of a timeout counter, define a maximum size value of a received command, receive a new command, determine if the new command received is greater than or less than the maximum size value of the received command, adjust, based on the determining, the weight value, adjust the maximum threshold value of the timeout counter, and define a maximum payload size (MPS).

In another embodiment, a data storage device includes a memory device and a controller coupled to the memory device. The controller includes means to determine whether a new request is continuous with a previous request or a merged request stored in a buffer and means to adjust a timeout counter based upon data traffic.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 6 is a method illustrating an update of a weight value, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to effective transport layer packet (TLP) utilization. When the controller of the data storage device generates a request for transferring data to or from the storage device, the request is stored in a merging buffer. The merging buffer may include previously generated requests, where the previously generated requests and the new requests are merged. A timeout counter is initialized for the requests stored in the merging buffer. The timeout counter has a configurable threshold value that corresponds to a weight value, adjusted for latency or bandwidth considerations. When the merged request is greater than the maximum TLP size, the merged request is partitioned, where at least one partition is in the size of the maximum TLP size. The request is sent from the buffer when the request is in the size of the maximum TLP size or when the threshold value is exceeded.

Figure 1:
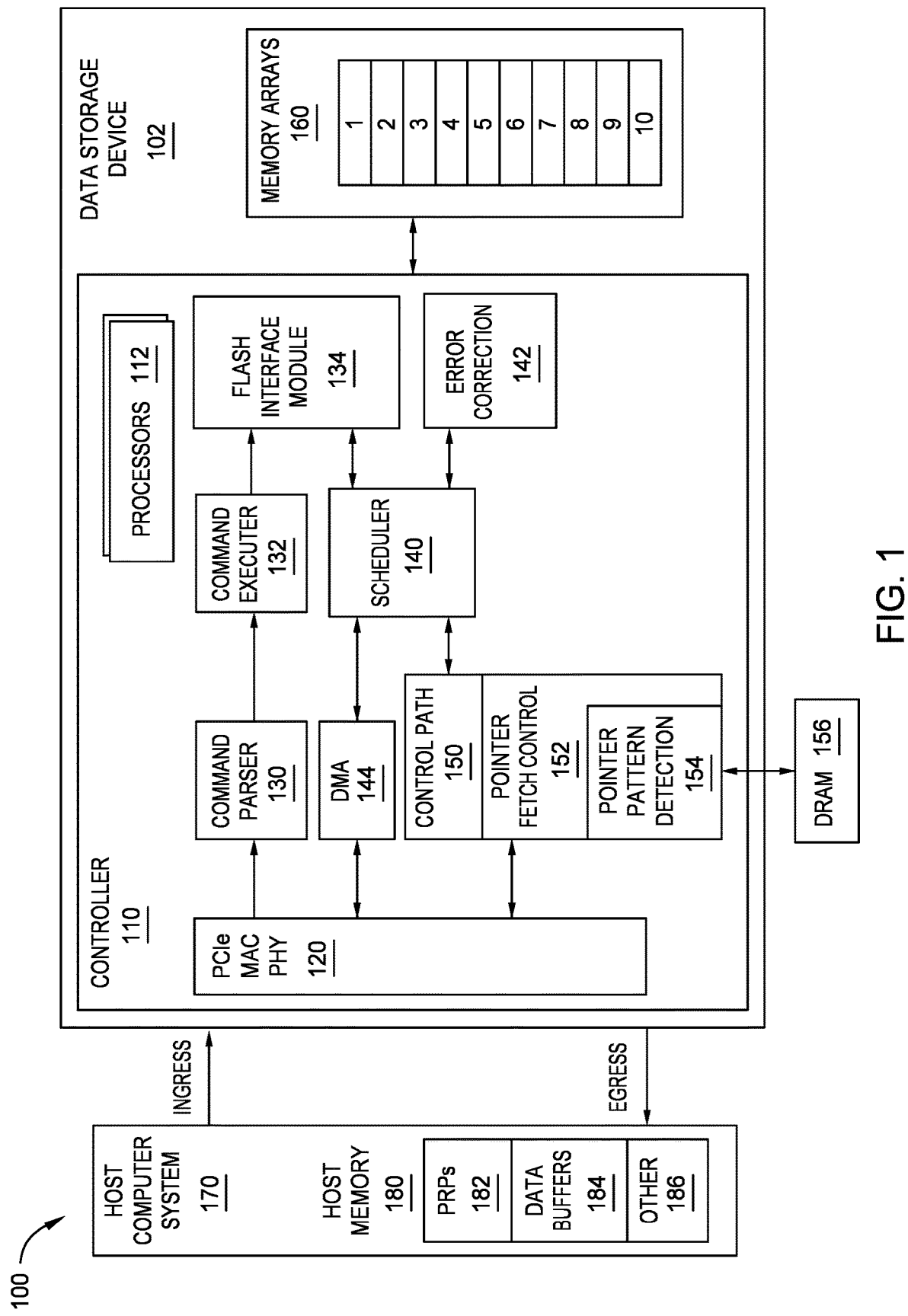
FIG. 1 is a schematic block diagram of an example computing system including a host computer system and a storage device, according to one embodiment.

FIG. 1 is a schematic block diagram of an example computing system 100 including a host computer system 170 and a data storage device 102, according to one embodiment. In some examples, the data storage device 102 may be a solid state drive for the host computer system 170. The host computer system 170 may utilize a non-volatile memory (NVM) included in data storage device 102 (shown as memory arrays 160) to write and to read data, such as for long term memory storage. The data storage device 102 may be an internal storage drive, such as a notebook hard drive or a desktop hard drive. The data storage device 102 may be a removable mass storage device, such as, but not limited to, a handheld, removable memory device, such as a memory card (e.g., a secure digital (SD) card, a micro secure digital (micro-SD) card, or a multimedia card (MMC)) or a universal serial bus (USB) device. The data storage device 102 may take the form of an embedded mass storage device, such as an eSD/eMMC embedded flash drive, embedded in host computer system 170. The data storage device 102 may also be any other type of internal storage device, removable storage device, embedded storage device, external storage device, or network storage device.

In some examples, the data storage device 102 may include additional components not shown in FIG. 1 for the sake of clarity. For example, the data storage device 102 may include a printed circuit board (PCB) to which components of the data storage device 102 are mechanically attached and which includes electrically conductive traces that electrically interconnect components of the data storage device 102, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 102 may be directly coupled (e.g., directly soldered) to a motherboard of the host computer system 170.

The host computer system 170 may be a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving).

The host computer system 170 includes a host memory 180, such as DRAM or other main memories. An application program may be stored to host memory 180 for execution by components of host computer system 170. The host memory 180 may include host queue, such as command submission queues and command completion queues. The host memory 180 includes physical region page (PRP) pointers 182, data buffers 184, such as a host data buffer, and other types of memory structures 186.

The data storage device 102 includes MAC and PHY components 120 for ingress of communications from host computer system 170 to data storage device 102 and egress of communications from data storage device 102 to host computer system 170. A link between data storage device 102 and host computer system 170 may be any appropriate link, such as a Peripheral Component Interface Express (PCIe) link in this example. A PCIe link may be one to thirty-two lanes, depending on the number of available PHYs connecting two PCIe connectors. The PCIe link is typically set during end point device initialization, such as initialization of data storage device 102.

The link between host computer system 170 and data storage device 102 operates under a communication protocol, such as PCIe serial communication protocol or other suitable communication protocols. Other suitable communication protocols include ethernet, serial attached SCSI (SAS), serial AT attachment (SATA), any protocol related to remote direct memory access (RDMA) such as Infiniband, iWARP, or RDMA over Converged Ethernet (RoCE), and other suitable serial communication protocols. In other examples, data storage device 102 may also be connected to host computer system 170 through a switch or a bridge.

In the PCIe communication protocol, host computer system 170 and data storage device 102 may send requests to each other as transport layer packets (TLPs). TLPs may include an optional TLP prefix, a TLP header, a data payload, and an optional TLP digest. A TLP header includes a type field, which may indicate types of transactions.

As TLPs are transferred between host computer system 170 and data storage device 102, a data link layer and physical layer are added to each TLP to ensure the TLP arrives at the intended destination. Each TLP includes a certain overhead from the added data link layer and physical layer. For example, TLP may include an optional end-to-end cyclic redundancy checksum (ECRC) in TLP digest. A data link layer adds the sequence number and link layer CRC (LCRC) to the TLP to ensure successful transmission across the link. A physical layer adds information to mark the beginning and end of the TLP.

The memory arrays 160 of storage device 102 may be configured for long-term storage of information as non-volatile memory space and retains information after power on/off cycles. The memory arrays 160 may consist of one of more dies of NAND flash memory. Other examples of non-volatile memory include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. The magnetic media non-volatile memory may be one or more magnetic platters in storage device 102. Each platter may contain one or more regions of one or more tracks of data. The memory arrays 160 may additionally include one or more types of non-volatile memory.

The data storage device 102 includes a controller 110 which manages operations of data storage device 102, such as writes to and reads from memory arrays 160. The controller 110 may include one or more processors 112, which may be multi-core processors. The processors 112 handles the components of data storage device 102 through firmware code.

The controller 110 may operate under NVM Express (NVMe) protocol, but other protocols are applicable. NVMe protocol is a communications interface/protocol developed for SSDs to operate over a host computer system and data storage device linked over a PCIe interface. NVMe protocol provides a command submission queue and command completion queue for access of data stored in data storage device 102 by host computer system 170. The data storage device 102 may fetch or read host commands from a command submission queue of host queues of host memory 180.

The controller 110 executes computer-readable program code (e.g., software or firmware) executable instructions (herein referred to as "instructions"). The instructions may be executed by various components of controller 110, such as processors 112, logic gates, switches, application specific integrated circuits (ASICs), programmable logic controllers, embedded microcontrollers, and other components of controller 110.

The instructions are stored in a non-transitory computer readable storage medium. In certain embodiments, the instructions are stored in a non-transitory computer readable storage medium of data storage device 102, such as in a read-only memory or memory arrays 160. Instructions stored in data storage device 102 may be executed without added input or directions from host computer system 170. In other embodiments, the instructions are transmitted from host computer system 170. The controller 110 is configured with hardware and instructions to perform the various functions described herein and shown in the figures.

The data storage device 102 may also include other components, such as flash interface module 134, a direct memory access (DMA) module 144, a scheduler 140, an error correction module 142, a command executor 132, and a control path 150. The flash interface module 134 interacts with memory arrays 160 for read and write operations. The scheduler 140 controls the data transfer while activating control path 150 for fetching physical page regions (PRPs), posting completion and interrupts, and activating the DMA module 144 for the actual data transfer between host computing system 170 and data storage device 102. The error correction module 142 corrects the data fetched from memory arrays 160. The command parser 130 fetches commands to command executor 132 for execution on flash interface module 134. The DMA module 144 executes data transfers between host computer system 170 and data storage device 102.

In general, host computer system 170 initiates data transfers (to data storage device 102 or from data storage device 102) by transmitting a host command to data storage device 102. Over NVMe, the data related to a host command may be indicated by a PRP entry or an SGL. In either system, the data of a host command is transmitted as a series of host command pointers to physical memory of host memory 180. In this example, host computer system 170 prepares the data to be transferred in data buffers 184 of host memory 180, and generates a set of pointers to the data to be transferred as PRPs 182. The control path 150, via pointer fetch control 152, receives the host command pointers and stores the host command pointers until the host command can be executed.

In this example, pointer pattern detection 154 is a module of pointer fetch control 152 which can be used to analyze host command pointers received from host computer system 170 to detect patterns in the host command pointers. As described in further detail below, if a pattern can be detected in the host command pointers, pointer pattern detection 154 can store the received pointers in a reduced pointer storage structure. In some examples pointer pattern detection 154 may be implemented as a hardware component of device controller 110, although in other examples pointer pattern detection 154 may be implemented as firmware of device controller 110.

The pointer pattern detection 154 stores host command pointers received from host computer system 170 in DRAM 156. In this example, DRAM 156 is shown outside of storage device 102, however, in other examples host command pointers may instead be stored internal to storage device 102, such as in an SRAM of the data storage device 102.

Figure 2:
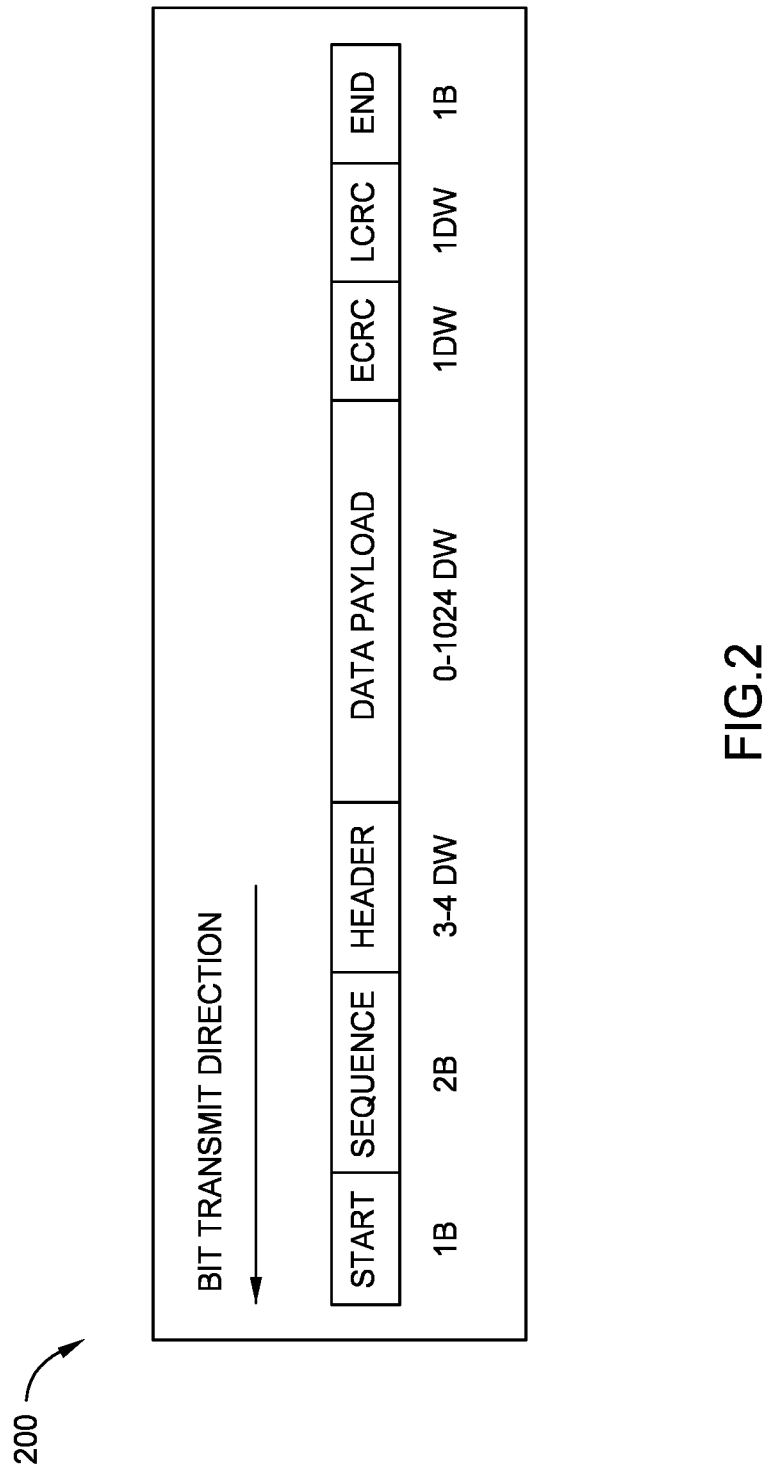
FIG. 2 is a schematic illustration of a TLP, according to one embodiment.

FIG. 2 is a schematic illustration of a TLP 200, according to one embodiment. As described in FIG. 1, the TLP 200 may include an optional TLP prefix, a TLP header, a data payload, and an optional TLP digest. The data payload is the information that is transferred between the host, such as the host computer system 170, and the data storage device, such as the data storage device 102 of FIG. 1. The data payload of the TLP 200 may have an average size of about 256 bytes or a maximum size of up to about 4 K or about 4,096 bytes. A TLP header includes a type field, which may indicate types of transactions. The TLP header may have a size between about 3 double words and 4 double words, where a double word is equal to about 32 bits or 4 bytes. Furthermore, the TLP 200 may include a data link layer, physical layer, and additional overhead. For example, the TLP 200 may include an optional end-to-end cyclic redundancy checksum (ECRC), where the ECRC has a size of about 1 double word. The previously listed values are not intended to be limiting, but to provide an example of a possible embodiment.

A data link layer adds the sequence number and link layer CRC (LCRC) to the TLP 200 to ensure successful transmission across the link, where the link is the transmission of data between the host and the data storage device. The sequence number size may be about 2 bytes and the LCRC size may have a size of about 1 double word. A physical layer adds information to mark the beginning and end of the TLP 200, where the information marking the beginning (i.e., "Start") has a size of about 1 byte and the information marking the end (i.e., "End") has a size of about 1 byte. The previously listed values are not intended to be limiting, but to provide an example of a possible embodiment.

Figure 3:
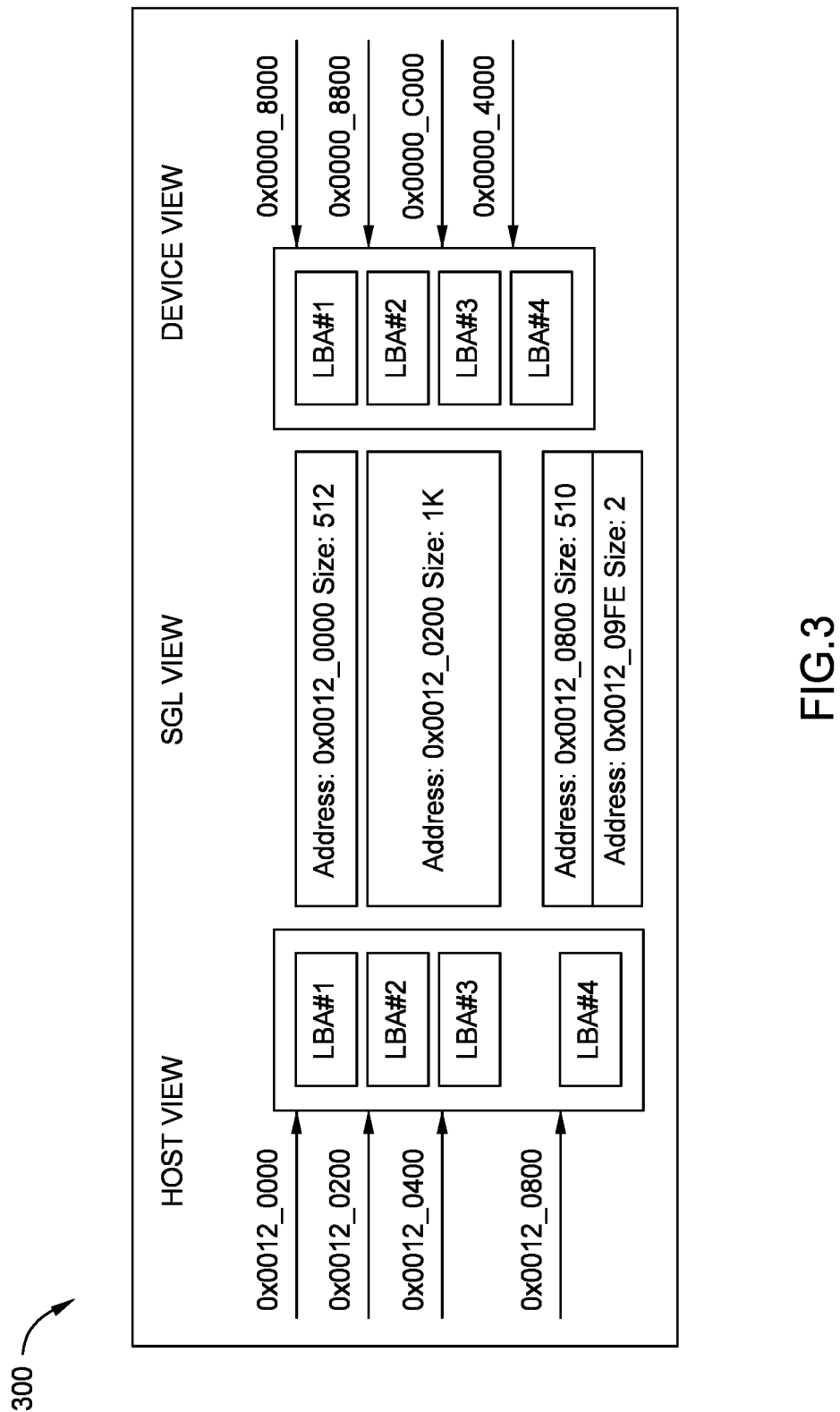
FIG. 3 is a schematic illustration of a command according to various views, according to one embodiment.

FIG. 3 is a schematic illustration of a command 300 according to various views, according to one embodiment. The command 300 has three different views, dependent on where the command 300 is being viewed from. The three different views include a host view, a scatter gather list (SGL) view, and a device view. The host view may be the view of the command 300 in the host computer system 170 of FIG. 1, such as where the device needs to read data from or write data to. The SGL view (including a physical region page (PRP) view) is a list provided to the device as to the host view. The device view may be the view of the command 300 in the data storage device 102 of FIG. 1, such as how the data is arranged in the NVM, such as the memory arrays 160 of FIG. 1.

The command 300 includes 4 logical block addresses (LBAs), LBA #1, LBA #2, LBA #3, and LBA #4. Each of the LBAs have a size of about 512 bytes. In the host view, the 4 LBAs are not continuous, as indicated by the space between LBA #3 and LBA #4. For example, in the host view, LBA #1 has an address of 0x0012_0000, LBA #2 has an address of 0x0012_0200, LBA #3 has an address of 0x0012_0400, and LBA #4 has an address of 0x0012_0800. If the 4 LBAs were continuous, then the address of the LBA #4 would be 0x0012_0600 rather than 0x0012_0800. However, in the device, the 4 LBAs are continuous, where the logical address of the next LBA follows the logical address of the previous LBA. For example, LBA #1 has an address of 0x0000_8000, LBA #2 has an address of 0x0000_8800, LBA #3 has an address of 0x0000_C000, and LBA #4 has an address of 0x0000_4000.

The SGL view includes 4 entries, where the first entry is the LBA #1, the second entry is the LBA #2 and the LBA #3, the third entry and the fourth entry are the LBA #4. When transferring data between the host and the device, the data may be transferred in a maximum TLP size, where the maximum TLP size is about 256 bytes in this example. For example, when the first entry is transferred, the first entry is transferred in 2 TLPs. Likewise, when the second entry is transferred, the second entry is transferred in 4 TLPs.

However, when transferring the LBA #4, the transfer may occur in either 3 transfers or 2 transfers. In the first example, the transfer occurs in 3 transfers where a first transfer is 256 bytes, the second transfer is 254 bytes, and the third transfer is 2 bytes. The first transfer and the second transfer are the transfers associated with the third SGL entry. Rather than performing 3 transfers, where each transfer has a TLP header information and other overhead, 2 transfers would have sufficed if the $3^{rd}$ transfer was continuous and consecutive with the $2^{nd}$ transfer. More specifically, the $3^{rd}$ address is the next address after the $2^{nd}$ address and hence, the $3^{rd}$ address is consecutive and continuous with the $2^{nd}$ address. For example, the first transfer may be 256 bytes and the second transfer may be 256 bytes, where the second transfer includes 254 bytes from the third SGL entry and 2 bytes from the fourth SGL entry. By having a minimal amount of transfers, bandwidth may be more efficiently utilized.

Figure 4:
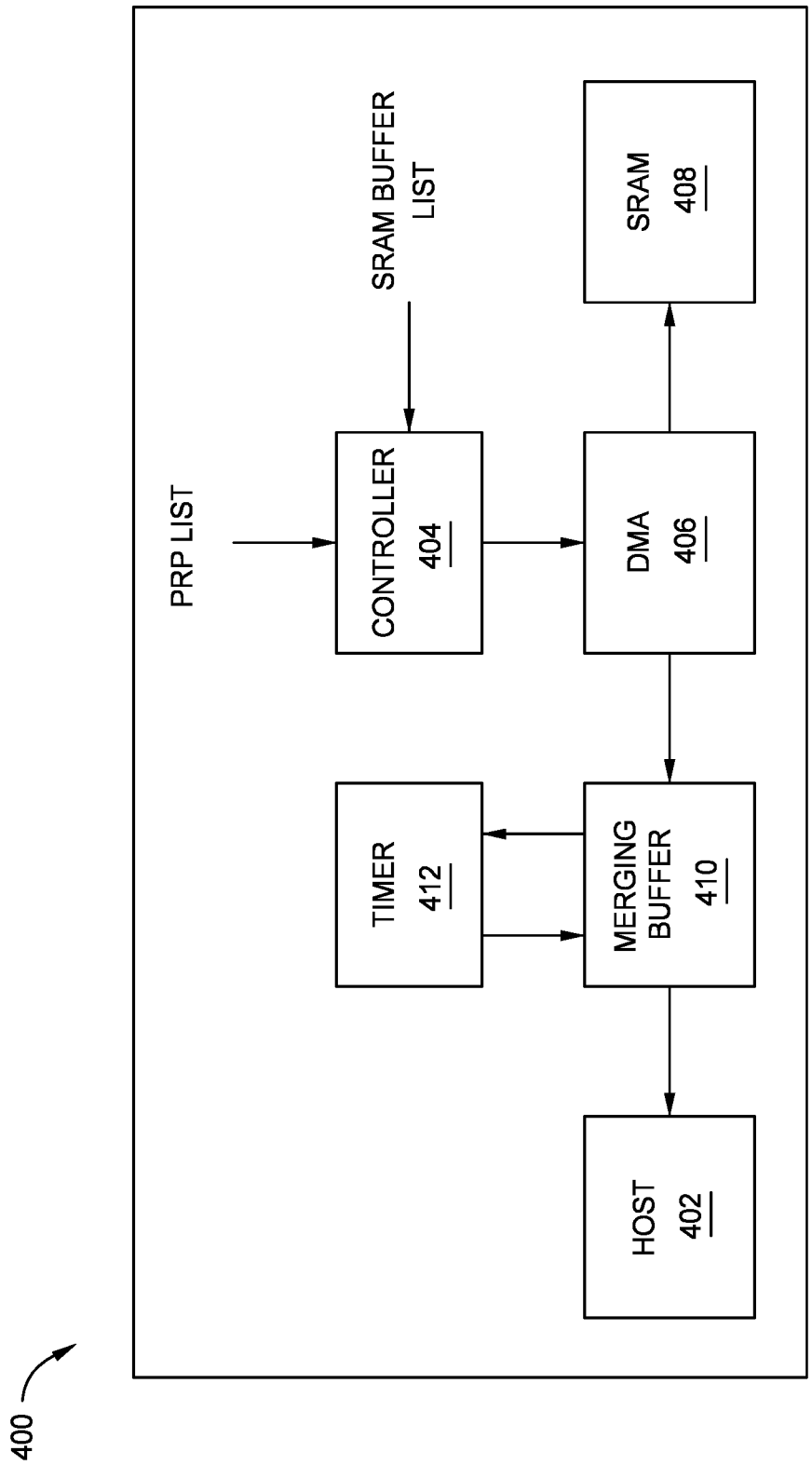
FIG. 4 is a schematic block diagram of the transfer of data to a host device, according to one embodiment.

FIG. 4 is a schematic block diagram of the transfer of data to a host device, according to one embodiment. A data storage device, such as the data storage device 102 of FIG. 1, includes a controller 404 that interacts with a DMA 406. The controller 404 may be the controller 110 of FIG. 1. A PRP list and a SRAM buffer list is utilized by the controller 404 to determine where the data is stored or will be stored in the SRAM 408 or any other memory device of the data storage device. It is to be understood that the SRAM buffer list is utilized as an example in the current figure and the buffer list may be any appropriate internal buffer list to track the location of data stored in the data storage device. Furthermore, when receiving a command, such as a read command, from a host device 402, the DMA 406 may generate one or more requests associated with the received command. For example, a received command may be associated with 4 generated requests.

The controller 404 activates the DMA 406 to read data associated with the one or more generated requests associated with the host command from the SRAM 408, or any other memory, and writes the relevant data back to the host 402. The DMA 406 passes the data associated with the one or more generated requests to a merging buffer 410, where the passed data is merged with any data that has a sequential logical address with the data located in the merging buffer 410.

For example, if the data in the merging buffer has a logical address of 0x000_8000, such as the LBA #1 of the device view described in FIG. 3, and a size of about 512 bytes, a sequential logical address would be 0x0000_8800. When a LBA with a sequential logical address is received at the merging buffer 410, the previous LBA and the received LBA are merged. However, when the received LBA is not sequential to the previous LBA, then the previous LBA is written to the host and the received LBA is programmed to the merging buffer 410.

The controller 404 utilizes a timer 412 to ensure that a generated request or a merged request does not remain in the merging buffer 410 longer than a time threshold. The timer 412 may be an individual timer for the last generated request received at the merging buffer and/or a timer for the merged request. When the timer 412 reaches the time threshold, the generated request or the merged request in the merging buffer 410 is written to the host 402. The time threshold may be a timeout counter, such as when the timer 412 reaches the time threshold, the generated request or the merged request has timed out. It is contemplated that the data storage device may include more than one merging buffer, such that each of the merging buffers has a timer associated with the generated request or the merged request stored in the relevant merging buffer.

Figure 5A:
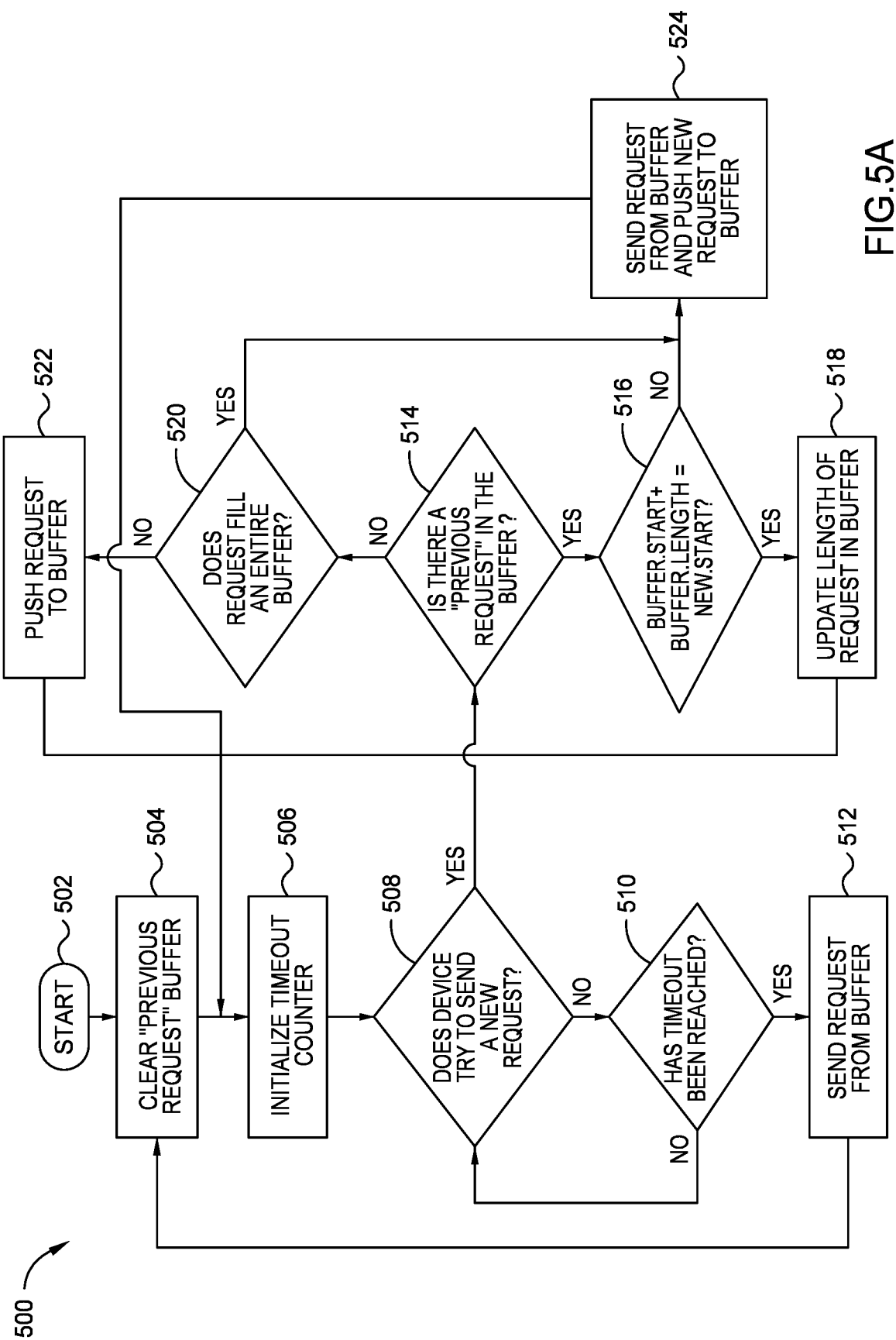
FIG. 5A is a method illustrating optimizing the storage of requests in a buffer, according to one embodiment.

FIG. 5A is a method 500 illustrating optimizing the storage of generated requests in a buffer, according to one embodiment. At block 502, the method 500 begins when the data storage device, such as the data storage device 102 of FIG. 1, attempts to send data associated with a new command to the host, such as the host computer system 170 of FIG. 1. It is to be understood that while the data storage device to host transaction is exemplified, the embodiments herein are applicable to the reciprocating transactions, such as the host to data storage device transactions. Furthermore, data may be retrieved or stored in any applicable location in the data storage device, such as a non-volatile memory or a volatile memory.

At block 504, the "previous request" buffer is cleared, such that the generated request or the merged request in the buffer, such as the merging buffer 410 of FIG. 4, are written to the respective location. The "previous request" buffer may be the generated request or the merged request stored in the merging buffer. The newly generated request associated with the new command is stored in the buffer after the "previous request" is cleared from the buffer.

At block 506, a timeout counter is initialized, where the timeout counter may be the timer 412 of FIG. 4. In some examples, the timeout counter is counting only when one or more requests or a merged request is located in the buffer. For example, when the buffer is empty, the timeout counter is not incrementing or initialized. At block 508, the controller determines if the data storage device has received an additional generated request from the host device, such as from the host computer system 170 of FIG. 1. If the controller determines that the additional generated request has not been sent at block 508, then the controller determines if a maximum threshold value of the timeout counter has been reached or exceeded at block 510. The maximum threshold value may be a configurable value based on the data traffic to and from the buffer.

If the controller determines that the timeout counter has not been reached at block 510, then the controller waits for the additional generated request to arrive at block 508. However, if the timeout has been reached at block 510, the controller sends the merged request of the one or more generated requests stored in the buffer to the host device at block 512. After sending the merged request of the one or more generated requests stored in the buffer at block 512, the buffer is cleared at block 504. In the description herein, the merged request may refer to either one or more requests or the merged request of the one or more generated requests, for exemplary purposes.

If, at block 508, the controller determines that the additional generated request has been received, the controller determines if there is a "previous request" in the buffer at block 514. The "previous request" may be the merged request of the one or more generated requests in the buffer. If the controller determines if there is a "previous request" in the buffer at block 514, then the controller determines if the logical address of the beginning of the additional new one or more generated requests are continuous with the logical address of the end of the "previous request" at block 516.

For example, the controller may determine if the BUFFER.START plus the BUFFER.LENGTH is equal to the NEW.START, where BUFFER.START is the beginning logical address of the request stored in the buffer, where the BUFFER.LENGTH is the length of the request stored in the buffer, and where the NEW.START is the logical address of the additional new request. When BUFFER.START+BUFFER.LENGTH=NEW.START, the logical addresses are continuous. However, when BUFFER.START+BUFFER.LENGTH≠NEW.START, the logical addresses are not continuous.

When the controller determines that the logical addresses are not continuous at block 516, the controller sends the previous merged request stored in the buffer to the host and pushes the additional new request to the buffer at block 524. A timeout counter is initialized at block 506 for the additional new request stored in the buffer at block 524.

However, if the controller determines that the logical addresses are continuous at block 516, then at block 518, the previous request or merged request stored in the buffer and the additional newly generated request are merged, such that the total size of the merged request is the size of the previous request or the merged request and the size of the additional newly generated request combined. After merging the requests in the buffer at block 518, a timeout counter is initialized at block 506 for the merged request with an updated total length.

If the controller determines that there is not a "previous request" in the buffer at block 514, then the controller determines if the newly generated request fills the entire buffer, such as when each buffer has a size equal to the maximum TLP size of about 256 bytes, at block 520. If the controller determines that the newly generated request does not fill an entire buffer at block 520, the newly generated request is sent to the buffer at block 522. A timeout counter is initialized at block 506 for the newly generated request stored in the buffer at block 522.

However, if the controller determines that the newly generated request fills the entire buffer at block 520, the newly generated request, in a size equal to the maximum TLP size, is sent from the buffer and the remaining data is pushed to the buffer at block 524. A timeout counter is initialized at block 506 for the remaining data stored in the buffer at block 524.

Figure 5B:
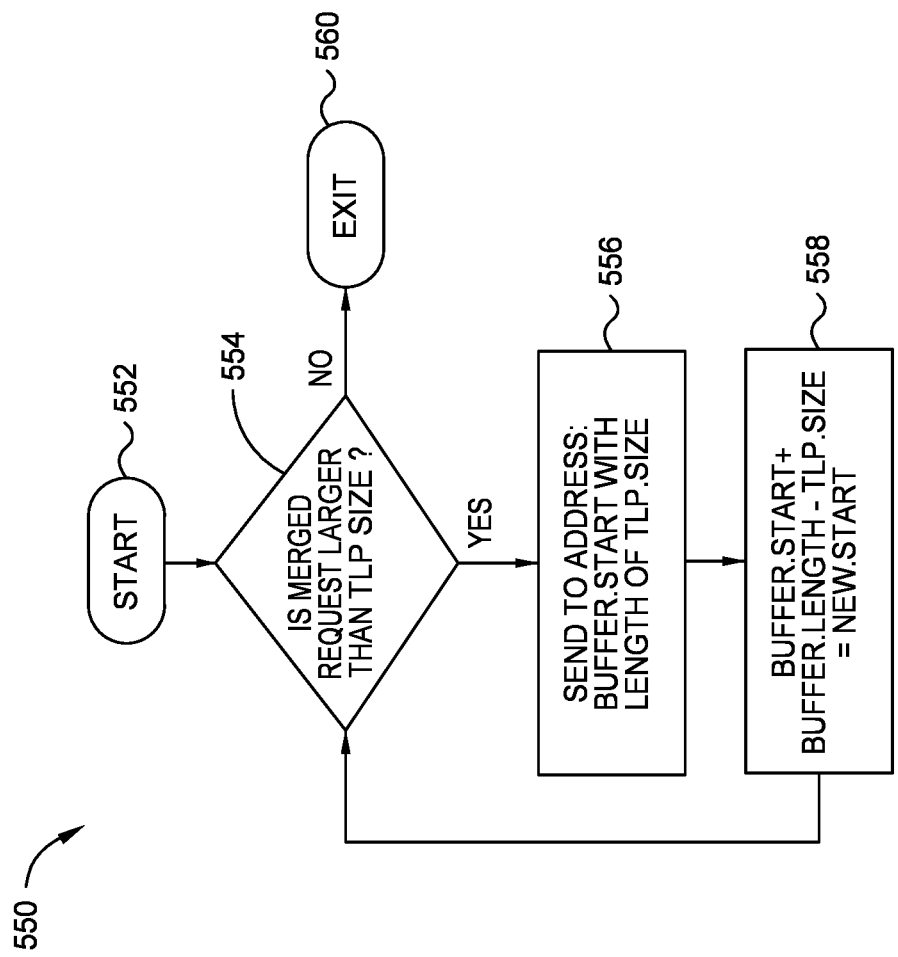
FIG. 5B is a method illustrating updating the length of the request in the buffer of FIG. 5A, according to one embodiment.

FIG. 5B is a method 550 illustrating updating the length of the merged requests in the buffer of FIG. 5A, according to one embodiment. The method 550 illustrates the updating the merged requests length at block 518 of FIG. 5A. At block 552, the previously generated request (previously newly generated requests in FIG. 5A) located in the buffer and newly generated request (previously additional newly generated request in FIG. 5A) are merged in the buffer. At block 554, the controller determines if the merged request is larger than the maximum TLP size. If the merged request is not larger than the TLP size at block 554, the method 550 exits at block 560 to the method 500, block 506, where a timeout counter is initialized for the merged request.

However, if the merged request is larger than the maximum TLP size at block 554, then the data, in the maximum TLP size, associated with the merged requests is sent to the target address, such as the host. For example, the maximum TLP size may be 256 bytes. The maximum TLP size may be referred to as the maximum payload size (MPS), such that the sent request is in the size of the MPS. The size of the request sent to the target address may be the request associated with the starting logical address, BUFFER.START, to the next logical address in a size of the maximum TLP size. For example, if the merged request has a size of about 510 bytes and the maximum TLP size is about 256 bytes, then the sent data is the first 256 bytes (i.e. bytes 1-256), where the remaining 254 bytes (i.e., bytes 257-510) remain in the buffer.

At block 558, the new starting logical address, NEW.START, of the merged request is updated, where the NEW.START is defined as BUFFER.START+BUFFER.LENGTH−TLP.SIZE=NEW.START. For example, if the BUFFER.START is 0, the BUFFER.LENGTH is about 510 bytes, the TLP. SIZE is 256, then the NEW.START is the logical address corresponding to the 257th byte (which is NEW.START=256), where the total merged data remaining has a size of about 254 bytes. After determining the new starting logical address, the method 550 returns to block 554 and repeats the process until the merged request is less than the maximum TLP size and exits the method 550 at block 560.

FIG. 6 is a method 600 illustrating an update of a weight value, according to one embodiment. The weight value adjusts the maximum threshold value of a timeout counter, such as the timeout counter utilized by the timer 412 of FIG. 4. When the maximum threshold value of the timeout counter is decreased, requests and/or merged requests are pushed from the buffer sooner than when the maximum threshold value of the timeout counter is increased. Likewise, the when weight value is decreased, the maximum threshold value is decreased, and vice-versa. When the controller recognizes that the buffer, such as the merging buffer 410 of FIG. 4, will receive one or more newly generated requests associated with a received host command, the method 600 begins at block 602.

At block 604, a weight value is initialized to a first value of 50. The weight value may have a lower bound or threshold of about 0 and an upper bound or threshold of about 100. The previously listed values are not intended to be limiting, but to provide an example of a possible embodiment. The bounds exemplifies the minimum and maximum that the weight value may adjust to when receiving multiple requests that have continuous logical addresses. When the weight value gets closer to the lower bound, the controller may focus on the transfer latency of the commands, such as by decreasing the waiting time between transferring. When the weight value gets closer to the upper bound, the controller may focus on the transfer bandwidth of the commands, such as by increasing the waiting time such that multiple requests may be merged. Furthermore, at block 604, the controller defines the length of a short command. For example, the short command may have a maximum size value or a maximum length of about 4,096 bytes. It is to be understood that while initializing the weight value and defining the length of a short command is shown to be as one step, the initializing and the defining may be in separate steps and in any order.

At block 606, the controller waits for a command sent by the host device, such as the host computer system 170 of FIG. 1, to be received by the controller. After receiving the command at block 606, the controller determines if the received command is a short command at block 608. If the received command is a short command at block 608, then the weight value is decreased by "z" at block 610. The "z" value is a minimum value that the weight value may be decreased by such as 1. However, if the received command is not a short command at block 608, then the weight value is increased by a function of the received command size.

The result of the function can be further limited by a max and min value defined as max(x, min(y, f(s))), where f(s), for example, is the size of the command divided by the definition of "short command size". For example, if the short command size is 4,096 bytes, a command of 8,196 bytes will have an f(s) of 2. The min function can be used to increase the f(s) value and the max function can be used to decrease the f(s) value, such as when f(s) does not meet: x≥(s)≥y. After increasing or decreasing the weight value, the method 600 returns to block 606, where the controller waits for another command to be received by the controller, where the weight value of the timer is re-calibrated.

It is to be understood that each buffer will have a corresponding timer. The timer can be re-started when new requests go into the buffer or when merged requests are pushed out of the buffer. The timer has a weighted limit that depends upon the traffic that exists. For example, if there are multiple small transactions, the traffic is called "random" while if there are fewer, longer transactions, the traffic is called "sequential". The more sequential the traffic, the more time available to wait for new requests and the possibility of merging requests. The more random the traffic, the less time available to wait for a new request.

By dynamically adjusting the timer to account for different sized commands, the overhead associated with transferring the commands between the host device and the data storage device may be optimized, thus increasing bandwidth and decreasing latency, or vice versa. By combining consecutive addresses, TLPs may be more efficiently utilized improving the bandwidth.

In one embodiment, a data storage device includes a memory device and a controller coupled to the memory device. The controller is configured to receive a new command, generate one or more requests associated with the new command, determine whether a beginning of a newly generated one or more requests is continuous with an end of a previous request or a merged request stored in a buffer, and either update a length of the previous request or the merged request stored in the buffer to a new length that includes the newly generated one or more requests or send the previous request or the merged request from the buffer and push the newly generated one or more requests to the buffer.

The determining includes checking a first logical address of the end of the previous request or the merged request and checking a second logical address of the beginning of the newly generated one or more requests. The updating includes merging a first size of the previous request or the merged request and a second size of the newly generated one or more requests if the beginning of the newly generated one or more requests is continuous with the end of the previous request or the merged request. The sending includes transferring a portion of the previous request or the merged request in a size equal to a maximum TLP size. The determining includes checking a timeout counter for the previous request or the merged request. Each buffer has a corresponding timeout counter. A maximum threshold value of the timeout counter is determined by a weight value of a timer. The weight value is increased if the new command has a size larger than a maximum size value and decreased if the new command has a size smaller than a maximum size value. The controller is further configured to send the previous request or the merged request from the buffer and push the newly generated one or more requests to the buffer upon determining the maximum threshold value will be exceeded.

In another embodiment, a data storage device includes a memory device and a controller coupled to the memory device. The controller is configured to initialize a weight value, wherein the weight value affects a maximum threshold value of a timeout counter, define a maximum size value of a received command, receive a new command, determine if the new command received is greater than or less than the maximum size value of the received command, adjust, based on the determining, the weight value, adjust the maximum threshold value of the timeout counter, and define a MPS.

The weight value is initialized at a first value of 50. The weight value has a minimum threshold of about 0 and a maximum threshold of about 100. The adjusting the weight value includes decreasing the weight value by "z" if the new command received is less than the maximum size value of the received command and increasing the weight value by a max function if the new command received is greater than the maximum size value of the received command. The "z" is a minimum value to decrease the weight value by. The max function is max(x, min(y, f(s))). The "x" is a minimum value to increase the weight value by. The "min(y, f(s))" is a minimum value to increase the weight value by. The "f(s)" is a size of the new command divided by the maximum size value.

The adjusting the maximum threshold value of the timeout counter includes decreasing the maximum threshold value when the weight value decreases and increasing the maximum threshold value when the weight value increases. The decreasing the maximum threshold value decreases the time a request or a merged request is stored in a buffer and increasing the maximum threshold value increases the time the request or the merged request is stored in the buffer. The request or the merged request is sent from the buffer when the maximum threshold value is exceeded. The request or the merged request is merged with a previous request or a previously merged request in the buffer when the maximum threshold value is not exceeded. The maximum size value of the received command is a size of a short command. The request or the merged request is sent from the buffer in the MPS. A first logical address of the previous request and a second logical address of the request are continuous.

In another embodiment, a data storage device includes a memory device and a controller coupled to the memory device. The controller includes means to determine whether a new request is continuous with a previous request or a merged request stored in a buffer and means to adjust a timeout counter based upon data traffic.

The means to determine, when the new request is continuous with the previous request or the merged request, includes means to merge the new request and the previous request or the merged request stored in the buffer. The means to adjust a timeout counter includes means to initialize a weight value, wherein the weight value is adjusted based on incoming commands, means to determine a maximum size value of a received command, means to determine if the incoming commands are greater than or less than the maximum size value, and either means to increase, if the incoming commands are greater than the maximum size value, the weight value, wherein increasing the weight value increases a maximum threshold value or means to decrease, if the incoming commands are less than the maximum size value, the weight value, wherein decreasing the weight value decreases the maximum threshold value. The controller further including means to send the previous request or the merged request from the buffer in a size equal to the maximum transport layer packet (TLP) size. The maximum TLP size is equal to a maximum payload size. The exceeding the maximum threshold includes sending the previous request or the merged request from the buffer.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
    a memory device; and
    a controller coupled to the memory device; the controller configured to:
        receive a new command;
        generate one or more requests associated with the new command;
        determine whether a beginning of a newly generated one or more requests is continuous with an end of a previous request or a merged request stored in a buffer, wherein the determining comprises checking a timeout counter for the previous request or the merged request, and wherein each buffer has a corresponding timeout counter; and
        either:
            update a length of the previous request or the merged request stored in the buffer to a new length that includes the newly generated one or more requests; or
            send the previous request or the merged request from the buffer and push the newly generated one or more requests to the buffer.

2. The data storage device of claim 1, wherein the determining comprises checking a logical address of the end of the previous request or the merged request and checking a second logical address of the beginning of the newly generated one or more requests.

3. The data storage device of claim 1, wherein the updating comprises merging a first size of the previous request or the merged request and a second size of the newly generated one or more requests if the beginning of the newly generated one or more requests is continuous with the end of the previous request or the merged request.

4. The data storage device of claim 1, wherein the sending comprises transferring a portion of the previous request or the merged request in a size equal to a maximum transport layer packet (TLP) size.

5. The data storage device of claim 1, wherein a maximum threshold value of the timeout counter is determined by a weight value of a timer, wherein the weight value is increased if the new command has a size larger than a maximum size value and decreased if the new command has a size smaller than a maximum size value.

6. The data storage device of claim 5, wherein the controller is further configured to send the previous request or the merged request from the buffer and push the newly generated one or more requests to the buffer upon determining the maximum threshold value will be exceeded.

7. A data storage device, comprising:
    a memory device; and
    a controller coupled to the memory device, the controller configured to:
        initialize a weight value, wherein the weight value affects a maximum threshold value of a timeout counter;
        define a maximum size value of a received command;
        receive a new command;
        determine if the new command received is greater than or less than the maximum size value of the received command;
        adjust, based on the determining, the weight value;
        adjust the maximum threshold value of the timeout counter; and
        define a maximum payload size (MPS).

8. The data storage device of claim 7, wherein the weight value is initialized at a first value of 50, wherein the weight value has a minimum threshold of about 0 and a maximum threshold of about 100.

9. The data storage device of claim 7, wherein adjusting the weight value comprises decreasing the weight value by "z" if the new command received is less than the maximum size value of the received command and increasing the weight value by a max function if the new command received is greater than the maximum size value of the received command, and wherein "z" is a minimum value by which to decrease the weight value.

10. The data storage device of claim 9, wherein the max function is max(x, min(y, f(s))), wherein "x" is a maximum value to increase the weight value by, wherein "min(y,f(s))" is a minimum value to increase the weight value by, and wherein "f(s)" is a size of the new command divided by the maximum size value.

11. The data storage device of claim 7, wherein adjusting the maximum threshold value of the timeout counter comprises decreasing the maximum threshold value when the weight value decreases and increasing the maximum threshold value when the weight value increases.

12. The data storage device of claim 11, wherein decreasing the maximum threshold value decreases the time a request or a merged request is stored in a buffer and increasing the maximum threshold value increases the time the request or the merged request is stored in the buffer, wherein the request or the merged request is sent from the buffer when the maximum threshold value is exceeded, and wherein the request or the merged request is merged with a previous request or a previously merged request in the buffer when the maximum threshold value is not exceeded.

13. The data storage device of claim 12, wherein the maximum size value of the received command is a size of a short command, and wherein the request or the merged request is sent from the buffer in the MPS.

14. The data storage device of claim 12, wherein a last logical address of the previous request or the previously merged request and a second logical address of the request or the merged request are continuous.

15. A data storage device, comprising:
memory means; and
a controller coupled to the memory means, wherein the controller is configured to:
  determine whether a new request is continuous with a previous request or a merged request stored in a buffer, wherein the determining comprises checking a timeout counter for the previous request or the merged request, and wherein each buffer has a corresponding timeout counter;
  adjust the timeout counter based upon data traffic; and either:
    update a length of the previous request or the merged request stored in the buffer to a new length that includes the newly generated one or more requests; or
    send the previous request or the merged request from the buffer and push the newly generated one or more requests to the buffer.

16. The data storage device of claim 15, wherein the determining, when the new request is continuous with the previous request or the merged request, comprises merging the new request and the previous request or the merged request stored in the buffer.

17. A data storage device, comprising:
memory means; and
a controller coupled to the memory means, wherein the controller is configured to:
  determine whether a new request is continuous with a previous request or a merged request stored in a buffer; and
  adjust a timeout counter based upon data traffic, wherein the adjusting the timeout counter comprises:
    initializing a weight value, wherein the weight value is adjusted based on incoming commands;
    determining a maximum size value of a received command;
    determining if the incoming commands are greater than or less than the maximum size value; and
    either:
      increasing, if the incoming commands are greater than the maximum size value, the weight value, wherein increasing the weight value increases a maximum threshold value; or
      decreasing, if the incoming commands are less than the maximum size value, the weight value, wherein decreasing the weight value decreases the maximum threshold value.

18. The data storage device of claim 16, wherein the controller is further configured to:
send the previous request or the merged request from the buffer in a size equal to the maximum transport layer packet (TLP) size, wherein the maximum TLP size is equal to a maximum payload size.

19. The data storage device of claim 17, wherein exceeding the maximum threshold value comprises sending the previous request or the merged request from the buffer.

* * * * *